May 12, 1959 — D. E. BERGER — 2,885,863
CONTROL SYSTEM FOR SEPARATION PROCESSES
Filed June 20, 1955 — 2 Sheets-Sheet 1

INVENTOR.
D. E. BERGER
BY 
ATTORNEYS

May 12, 1959

D. E. BERGER 2,885,863

CONTROL SYSTEM FOR SEPARATION PROCESSES

Filed June 20, 1955

INVENTOR.
D.E. BERGER

BY Hudson and Young

ATTORNEYS

United States Patent Office 2,885,863
Patented May 12, 1959

2,885,863

CONTROL SYSTEM FOR SEPARATION PROCESSES

Donald E. Berger, Bartlesville, Okla., assignor to Phillips Petroleum Company, a corporation of Delaware Application June 20, 1955, Serial No. 516,557

11 Claims. (Cl. 62—32)

This invention relates to the control of separation processes. In one of its aspects, it relates to a control system which automatically controls a separation process so as to produce two products of specification quality. In another of its aspects, it relates to a method for controlling the operation of fractionation columns so as to process a maximum quantity of feed while obtaining two products of specification quality.

In the petroleum and petrochemical industries, considerable work has been directed in recent years toward the development of more efficient separation processes. One of the most important aspects of this work concerns improvements in the control of separation processes so as to obtain a product stream having a specified purity. In the prior art separation processes which utilize fractionation columns, it is conventional to control the processes so that one stream only of specification quality is recovered as a product, the purity of the other product stream being in effect disregarded. For example, when the desired product is taken overhead from a fractionation column, the column is controlled so that the overhead product has the desired purity while the bottoms product has the composition resulting from the removal of all the remaining feed components as bottoms product.

When processing certain feed streams which are essentially binary systems, it would be desirable to effect a separation so as to recover two products of specification quality. Such a separation would eliminate the necessity for further treatment of one of the column product streams as required in conventional processes, thereby effecting a substantial saving in operational costs. Further, it would be desirable if the fractionation equipment could be operated so as to process the maximum quantity of feed while producing the two products of specification quality. In accordance with this invention, a control system is provided which automatically controls the operation of a fractionation column so as to produce two products of specification quality at the maximum rate attainable with the installed equipment.

The following are objects of the invention.

It is an object of this invention to provide a method for controlling separation processes.

Another object of the invention is to provide a control system for use with a fractionation column, which makes possible the recovery of two products of specification quality.

Still another object of the invention is to provide an improved method for controlling the operation of a fractional distillation column.

Yet another object of the invention is to provide a method for controlling the operation of an extractive distillation column.

A further object of the invention is to provide a method for controlling the operation of an azeotropic distillation column.

A still further object of the invention is to provide a method for controlling the operation of an absorption column.

Still other and further objects and advantages of the invention will become apparent to those skilled in the art upon consideration of the following disclosure.

The present invention is applicable to the control of fractionation columns in general. More specifically, the invention can be advantageously used in controlling the operation of ordinary fractional distillation columns, extractive distillation columns and azeotropic distillation columns. It is not intended, however, to limit the invention to distillation processes, for it can be used as well in conjunction with other separation processes such as absorption processes.

In separation processes of the type with which this invention is concerned, use is made of columns or towers to complete the separation of the components in one operation. Fractionation columns which may be employed include sieve plate columns, bubble-cap plate columns, packed columns, and the like. Where a considerable difference in boiling points exists between the component to be separated and the other components in a feed mixture, simple fractional distillation is generally used to effect the desired separation. In such a process, there are certain process variables which must be closely controlled in order to bring about an efficient separation. These variables in an ordinary fractional distillation process include rate of overhead product withdrawal, rate of bottoms product withdrawal, rate of reflux, rate of feed introduction and rate of supply of reboiler heat to the column. Since all of these variables are interrelated, a change in one of the variables concomitantly causes a shift in one or more of the other variables.

Many distillable mixtures can not be separated by ordinary distillation either because the components boil too close together or because they form a constant boiling mixture. Extractive distillation and azeotropic distillation are processes which make possible the separation of many of these mixtures. Both processes make use of the principle that the addition of another component to the mixture undergoing distillation changes the relative volatility of the components of the mixture. The introduction into the column of a substance not normally present in the mixture to be separated results in another process variable in addition to those present in the simple distillation process.

Absorption processes are usually used in place of distillation when one or more of the components to be separated cannot be condensed conveniently. The process variables are similar to the variables encountered in extractive and azeotropic distillation processes.

Broadly speaking, the present invention resides in a means and method for controlling the operation of a fractionation column so as to produce two products of specification quality. In a broad aspect, the method of this invention relates to the separation of an essentially binary mixture and comprises analyzing a sample removed from the upper portion of a fractionation column to determine the concentration therein of one of the components of the essentially binary mixture being separated, analyzing a sample removed from the lower portion of the column to determine the concentration therein of the other component of the mixture, and adjusting two of the process variables so that the composition of each of the two samples remains substantially constant with respect to the respective components being measured.

In accordance with the present invention, control over the separation processes so as to obtain two products of specification quality is effected automatically in a continuous manner through the novel utilization of a pair of infrared analyzers. The invention is not, however, limited to infrared analyzers, for other analytical instruments, e.g., mass spectrometers, can be used. When employing infrared analyzers, this invention is applicable to the separation of essentially binary mixtures containing components having distinctive radiation adsorption bands. The term binary mixture as used herein is intended to include a multi-component mixture which can be divided into two classes of materials, each of which exhibit characteristic radiation adsorption bands. As is well known, heteratomic molecules, i.e., those containing more than one kind of element, have the property of absorbing light energy in the infrared spectrum only at certain wave lengths which are characteristic of the molecule under consideration. Thus, a relatively simple analytical instrument can be provided by directing two beams of infrared radiation from a common source through a common sample cell to strike suitable radiation detectors. By placing a pure sample of the material whose presence is being determined in a filter cell disposed in one beam of radiation, any difference in intensity of the two beams impinging upon the respective detectors is indicative of the concentration of the particular substance in the sample stream.

A more complete understanding of the invention can be obtained by referring to the following detailed description and the drawing, in which.

Figure 1:
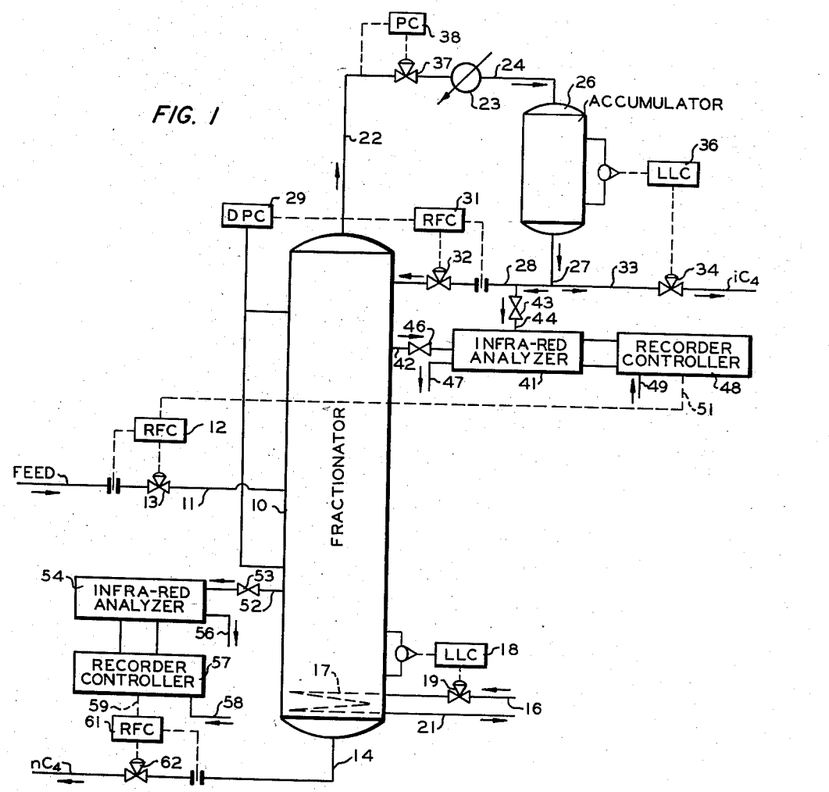
Figure 1 is a schematic view of fractional distillation apparatus including the analysis control system of this invention.

Referring now to the drawing and in particular to Figure 1, there is illustrated a fractional distillation column 10 of any suitable design employing vapor-liquid contacting means such as bubble-cap plates or the like. The binary mixture to be separated is charged to column 10 through line 11 at a rate controlled by rate-of-flow controller 12 which adjusts a valve 13 in line 11. The rate-of-flow controller is provided with a pneumatic set mechanism. Within column 10, the feed mixture is separated into a liquid kettle product which is withdrawn through line 14 and a vaporous overhead product which is withdrawn through line 22. Reboiler heat is supplied to the lower portion of column 10 through a steam line 16 which communicates with coils 17 disposed in the lower portion of the column. The rate of addition of steam to coil 17 is controlled by a liquid level controller 18 which adjusts a valve 19 in line 16 in response to the liquid level in the lower portion of column 10. The steam condensate is removed from the coils through line 21.

The gases which comprise the relatively light component of the binary feed mixture are passed from the upper portion of column 10 through line 22 to a condenser 23 wherein they are condensed. The resulting condensate is then directed through line 24 to a reflux accumulator 26. The distillate collected in accumulator 26 is discharged through line 27, a portion of the distillate then being directed through line 28 back into the upper portion of column 10 as reflux. The rate at which distillate is returned to column 10 as reflux is dependent upon the setting given differential pressure controller 29 which acts as an override for rate-of-flow controller 31. Rate-of-flow controller 31, which is provided with a pneumatic set mechanism, adjusts valve 32 in line 28. The differential pressure controller, which measures the pressure drop through the column and which is given a setting corresponding to the pressure drop desired to be maintained through the column, supplies a pneumatic signal proportional to the measured pressure drop to the pneumatic set mechanism associated with rate-of-flow controller 31. The pneumatic set mechanism in turn resets the index setting of the rate-of-flow controller with the result that valve 32 in line 28 is adjusted so that reflux is supplied to the column at a rate sufficient to maintain a pressure drop through the column corresponding to the setting of the differential pressure controller. It is also within the scope of the invention to have the differential pressure controller adjust valve 32 directly in which case the rate-of-flow controller and its associated set mechanism can be eliminated. The remainder of the distillate removed from accumulator 26 is passed through overhead product line 33 at a rate proportional to the liquid level in accumulator 26. Valve 34 in line 33 is controlled by a liquid level controller 36 which is operatively connected to the accumulator. In order to maintain a desired operating pressure in column 10, a valve 37 is disposed in line 22 upstream from condenser 23. Valve 37 is adjusted by a pressure controller 38 which is actuated by the pressure in line 22.

In order to attain a better understanding of the invention, the distillation process will be described with relation to a specific separation such as the separation of isobutane from normal butane. Accordingly, an essentially binary mixture of normal butane and isobutane containing not more than about 0.2 mol percent of other components, such as $C_3$ and $C_5$ hydrocarbons, is charged to column 10 through line 11. It is to be understood that the invention is not limited to this specific separation, for it is applicable to the separation of any essentially binary mixtures, the components of which absorb infrared radiation at different wave lengths. For example, the invention can be advantageously used in the separation of mixtures of isopentane and normal pentane, ethylene and ethane, propylene and propane, etc. In the separation of normal butane and isobutane, isobutane is taken overhead as one product of the process while normal butane is recovered from the bottom of the column as the other product. By carrying out the separation utilizing two analytical instruments such as infrared analyzers to control the rate of feed introduction and bottoms withdrawal, it is possible to obtain two products of specification quality. It is also within the contemplation of the invention to utilize the two infrared analyzers to control other variables than those mentioned. For example, the infrared analyzer used to control the rate of withdrawal of the bottoms product can be used instead to control the rate at which reboiler heat is supplied to the column in which case the bottoms product withdrawal is placed on liquid level control.

A sample stream is removed from the upper portion of column 10 and passed to infrared analyzer 41 which has been sensitized for normal butane. The sample can be taken from one of the upper plates in the column in which case it is introduced into the analyzer through line 42, valve 43 in line 44 being closed. Alternatively, a sample of the overhead product stream can be passed to the analyzer through line 44, valve 46 in line 42 being closed. It is to be understood that when the sample is taken from a plate in the upper portion of the column, the amount of normal butane present in the sample will be greater than when the sample is taken directly from the overhead stream. However, a determination of the amount of normal butane which should be present in the sample removed from the tray in order to give a product having a desired composition can be easily made by one skilled in the art. Line 47 provides means for removing the sample stream from analyzer 41.

The output signal from analyzer 41 is applied to potentiometer recorder-controller 48 which is supplied with a source of input air through line 49. Controller 48 provides a regulated output air pressure in line 51, which is proportional to the signal from analyzer 41. It is noted also that the pressure in line 51 is proportional to the amount of normal butane contained in the sample stream. As mentioned hereinabove, rate-of-flow controller 12, which adjusts valve 13 in line 11, is provided with a pneumatic set mechanism. The output air pressure in line 51 is applied to the pneumatic set mechanism which in turn adjusts the set point of rate-of-flow controller 12. In this manner, the rate at which the feed mixture is supplied to the column is controlled in accordance with the amount of normal butane contained in the sample stream.

Another sample stream is removed from the lower portion of column 10 through line 52, containing a valve 53, and passed to infrared analyzer 54 which has been sensitized for isobutane. The sample can be taken from one of the lower plates in the column, e. g., in an eighty tray column it can be advantageously taken from the twentieth tray from the bottom of the column. As noted with regard to the first sample, the amount of isobutane which should be present in the sample in order to provide a bottoms product of desired purity can be easily determined. The sample is removed from analyzer 54 through line 56. The output signal from analyzer 54 is applied to potentiometer recorder-controller 57 which is supplied with a source of input air through line 58. Controller 57 provides a regulated output air pressure in line 59 which is proportional to the signal from analyzer 54. The output air pressure in line 59 is also proportional to the amount of isobutane contained in the sample stream. Rate-of-flow controller 61, which adjusts valve 62 in line 14, is provided with a pneumatic set mechanism. The output air pressure in line 59 is applied to the pneumatic set mechanism which in turn adjusts the set point of rate-of-flow controller 61. The rate at which the bottoms product normal butane is withdrawn from the column is thus controlled in accordance with the amount of isobutane contained in the sample stream. As described hereinabove, the infrared analyzers function as overrides for rate-of-flow controllers 12 and 61. While it is desirable from an operational standpoint to provide the controllers so as to ensure regulated flow within definite limits if the infrared analyzers should for some reason fail to operate properly, it is within the scope of the invention to omit the rate-of-flow controllers. When the rate-of-flow controllers are not used, the infrared analyzers and their associated controllers are used to directly control valves 13 and 62 in lines 11 and 14.

The control instruments as discussed herein are commercially available items of manufacture, and it is not intended to limit the invention to any specific type of instrument. Although the instruments as described supply a pneumatic signal, it is within the scope of the invention to utilize a type of controller which furnishes an electrical signal in which case electrically operated valves would be used.

Figure 2:
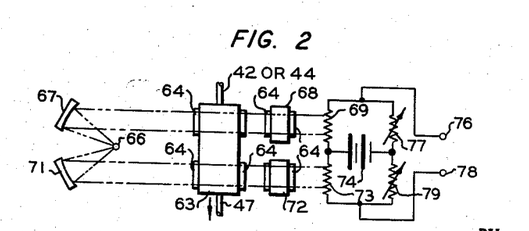
Figure 2 is a schematic representation of an infrared analyzer suitable for use with this invention.

Figure 2 of the drawing illustrates schematically an infrared analyzer which can be used in conjunction with this invention. With reference to infrared analyzer 41, the sample stream removed through line 42 or line 44, depending upon where the sample is taken from the column, is passed through sample cell 63 and is vented through conduit 47. Cell 63 is provided with two pairs of opposing windows 64 made of a material, such as quartz, which is transparent to the desired infrared radiation directed therethrough. Infrared radiation is provided by an element 66 which can be a coil of heated wire. A first beam of radiation emitted from element 66 is reflected from a mirror 67 through sample cell 63 and an empty cell 68 to impinge upon a first radiation sensitive electrical resistance element 69. A second beam of radiation from element 66 is reflected from mirror 71 through cell 63 and filter cell 72 to impinge upon a second radiation sensitive electrical resistance element 73. Cell 68 and filter cell 72 are each provided with a pair of opposing windows similar to those of sample cell 63. Since analyzer 41, as noted above, is sensitized to normal butane, filter cell 72 is filled with a sample of normal butane at atmospheric pressure.

Resistance elements 69 and 73 are connected in adjacent arms of a Wheatstone bridge circuit. The junction between elements 69 and 73 is connected to one terminal of a voltage source 74. The second terminal of resistance element 69 is connected to an output terminal 76 and to the first end terminal of a variable resistance 77. The second terminal of resistance element 73 is connected to a second output terminal 78 and to the first end terminal of a variable resistance 79. The second end terminals of resistors 77 and 79 are connected to one another and to the second terminal of voltage source 74.

When a sample stream containing small amounts of normal butane is circulated through analyzer 41, the radiation received by element 73 is less than the radiation received by element 69 because of the adsorption by the normal butane in cell 72. With no normal butane in the sample, the difference in radiation received by the two elements would be at a maximum. As the concentration of normal butane in the sample cell increases, however, the radiation received by elements 69 and 73 becomes more nearly equal. The radiation received by element 73 does not change appreciably as the concentration of normal butane increases because that portion of the radiation which is absorbed by normal butane in cell 63 was adsorbed at the lower concentrations by the normal butane in cell 72. The radiation received by element 69 decreases, however, with an increase of normal butane in the sample cell because of the absorption by normal butane in cell 63. The magnitude of the voltage appearing between terminals 76 and 78 is, therefore, a function of the normal butane content of the sample stream removed from column 10 and passed to the analyzer through lines 42 or 44. The output signal between terminals 76 and 78 is applied to controller 48 so that the air pressure in line 51 is a function of the amount of normal butane present in the sample stream removed from the column. The output air pressure from controller 48 is applied through line 51 to the pneumatic set mechanism associated with rate-of-flow controller 12, which in turn, as previously noted, adjusts the set point of the controller.

Infrared analyzer 54, which is similar to analyzer 41 except that it is sensitized to isobutane, will also be described with relation to Figure 2. Accordingly, filter cell 72 of analyzer 54 is filled with a sample of isobutane at atmospheric pressure. With small amounts of isobutane in the sample stream circulated through sample cell 63 of analyzer 54, the radiation received by element 73 is less than the radiation received by element 69 because of the absorption by the isobutane in cell 72. With no isobutane in the sample, the difference in radiation received by the two elements would be at a maximum. As the concentration of isobutane in the sample cell increases, however, the radiation received by elements 69 and 73 becomes more nearly equal. The radiation received by element 73 does not change appreciably as the concentration of isobutane increases because that portion of the radiation which is absorbed by isobutane was at the lower concentrations absorbed by the isobutane in filter cell 72. The radiation received by element 69 decreases, however, with an increase of isobutane in the sample cell because of the absorption by isobutane in sample cell 63. The magnitude of the voltage appearing between terminals 76 and 78 is, therefore, a function of the isobutane content of the sample stream removed from column 10 through sample line 52. The output signal from analyzer 54 is applied to controller 57 so that the air pressure in line 59 is a function of the amount of isobutane present in the sample stream removed from the column. The output air pressure from controller 57 is applied through line 59 to the pneumatic set mechanism associated with rate-of-flow controller 61 which in turn, as mentioned hereinabove, adjusts the set point of the controller.

In accordance with this invention, the fractional distillation column is preferably operated at the maximum throughput attainable with the installed equipment while producing two products of specification purity. Initially during the column start-up period, manual control is resorted to with the analyzers being utilized merely to give an indication of the composition of the overhead and bottoms product streams. The pressure drop through the column gives an indication of the liquid load on the column, and it is desirable that the load be as great as possible without causing flooding of the column. The pressure drop through the column which will give such a column loading will vary with the specific apparatus being used and the particular separation being made. It has been found that a pressure drop of about 0.1 p.s.i. per plate for light hydrocarbons up to about 0.15 p.s.i. per plate for heavy hydrocarbons gives this desirable column loading. When the analyzers indicate that the product streams have compositions approaching the specification requirements, the column is then put on automatic control. In one method for placing the column on automatic control, with a steady feed rate the bottoms product rate is controlled manually until the composition of the bottoms as indicated by analyzer 54 approaches the desired composition. At this point, the bottoms product withdrawal rate is switched to automatic control by supplying the output signal from controller 57 to the pneumatic set mechanism of rate-of-flow controller 61. The feed rate is then adjusted manually until such time as analyzer 41 indicates that the composition of overhead product approaches the desired composition. The feed rate is then switched to automatic control by supplying the output signal from controller 48 to the pneumatic set mechanism of rate-of-flow controller 12.

After the column operation has been lined out and is on automatic control as discussed above, the column operates automatically to produce two products of specification quality. In order to more clearly understand the invention, by way of example, it is assumed that the feed stream contains about 80 mol percent normal butane and 20 mol percent isobutane and that it is desired to recover an isobutane overhead product stream containing no more than 3 mol percent normal butane and a bottoms product stream containing no more than 1.5 mol percent isobutane. The set points of recorder-controllers 48 and 57 associated with analyzers 41 and 54 are set so as to correspond to these desired product compositions. For purpose of description, it is assumed that an increase in air pressure tends to open valves 13 and 62. Now if the analysis of the sample stream passed through analyzer 41 indicates that the overhead product stream contains more than 3 mol percent normal butane, the pressure of the output air signal from controller 48 decreases, and valve 13 is closed somewhat in order to decrease the rate of feed introduction. Conversely, if the analysis shows that the overhead product stream contains less than 3 mol percent normal butane, then the output signal from controller 48 increases and valve 13 is opened further in order to increase the rate of feed introduction. In the case of the bottoms product, the pressure of the output signal from controller 57 increases or decreases depending upon the analysis of the sample stream removed from column 10 through line 52. If the analysis of the sample stream indicates a kettle product containing more than 1.5 mol percent isobutane, then controller 57 supplies a decreasing air pressure so that valve 62 is closed somewhat, thereby decreasing the rate of bottoms product withdrawal. On the other hand, when the analysis of the sample stream shows a kettle product containing less than 1.5 mol percent isobutane, controller 57 supplies an increasing air output so that valve 62 is opened further so as to increase the rate of kettle product withdrawal. Thus, by utilizing a pair of infrared analyzers to control the rate of feed introduction and the rate of kettle product withdrawal, it becomes possible to obtain two products of specification quality when operating at a maximum throughput capacity.

The change in any one of the process variables as described hereinabove causes concomitant changes in other process variables. The instrumentation of this invention automatically makes the necessary changes so that two products of specification quality are continuously recovered from the column. A clearer understanding of the manner in which such changes are made can be obtained by considering the effect upon the operation of the column of a change in feed composition, e.g., an increase in the normal butane content of the feed stream from 80 mol percent to 85 mol percent and a corresponding reduction in isobutane from 20 mol percent to 15 mol percent.

As a result of the increase in the normal butane content of the feed stream entering the column through line 11, the analysis of the sample stream fed to analyzer 41 through lines 42 or 44 shows an increase in the normal butane concentration therein above the set point of the analyzer. Recorder-controller 48, therefore, supplies an output air signal of decreased pressure, and valve 13 is closed somewhat in order to decrease the rate of feed introduction.

The reduction in the amount of feed charged to the column brings about a greater reflux to feed ratio. And because of the increase in the relative amount of reflux, the analysis of the sample stream removed from the column through line 52 shows an isobutane concentration which is lower than the set point of analyzer 54. Recorder-controller 57 as a result supplies an air output signal of increased pressure so that valve 62 is opened somewhat, thereby increasing the kettle product withdrawal rate. Since the withdrawal rate of kettle product is increased, the liquid level in the bottom of the column is lowered, and liquid level controller 18 operates to reduce the steam rate. This in turn causes a reduction in the amount of vapor rising through the column.

With a reduction in the rate of vapor removed from the column through line 22, the liquid level in overhead accumulator 26 is lowered. Liquid level controller 36 then operates through valve 34 to decrease the amount of overhead product recovered through line 33. Because of the reduced vapor rate, there is also a slight decrease in pressure drop through the column, and to compensate therefor differential pressure controller 29 functions through controller 31 and valve 32 to increase the reflux rate. The increase in reflux rate decreases still further the rate of overhead product withdrawal because of the resulting drop in the liquid level in accumulator 26.

As a result of the increase in reflux rate, the analysis of the sample stream fed to analyzer 41 through lines 42 or 44 improves, i.e., the normal butane concentration becomes less than the index setting of the analyzer, and recorder-controller 48 then operates to increase the rate of feed introduction. Now because of the increase in reflux and in feed, the liquid level in the bottom of the column rises, and liquid level controller 18 operates valve 19 so that the steam rate is increased. With the increase in steam rate, there is also more vapor rising through the column, causing a slight increase in the pressure drop through the column. The differential pressure controller now operates to restore the reflux rate towards its original value. It will be apparent from the foregoing discussion that in accordance with this invention the process variables are automatically adjusted in accordance with the new feed analysis so that the feed stream is continuously separated into two product streams of predetermined composition.

Figure 3:
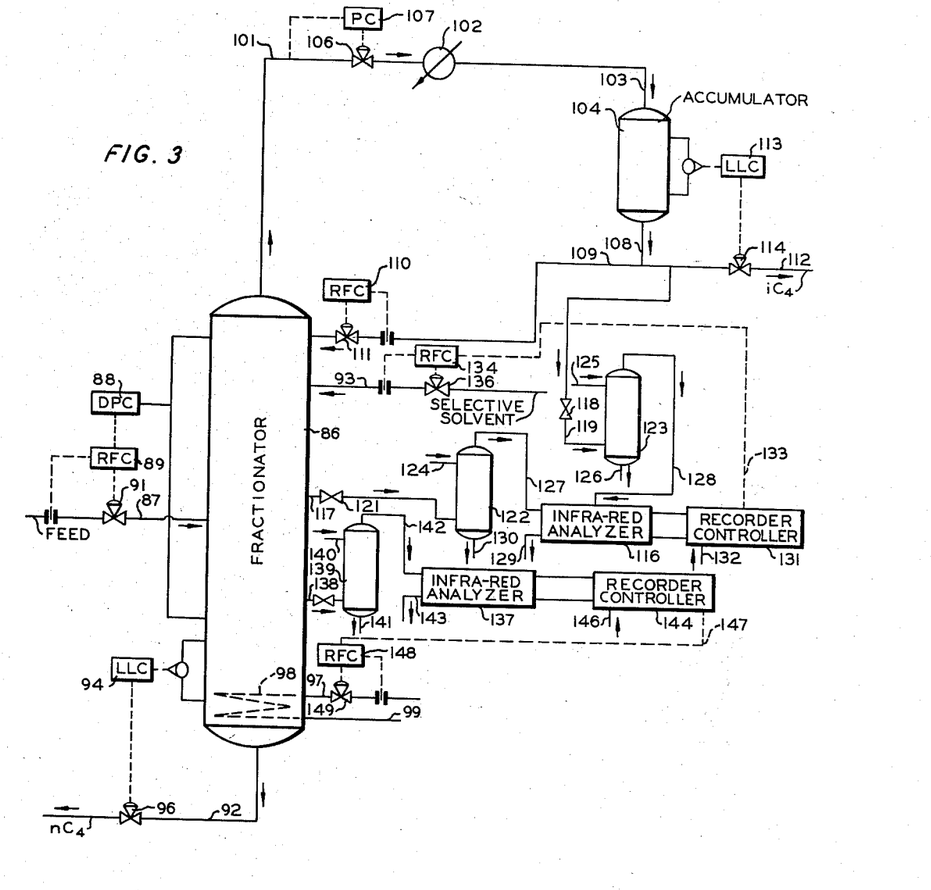
Figure 3 is a schematic view of extractive distillation apparatus including the analysis control system of this invention.

As mentioned hereinabove, the analysis control system of this invention is applicable to separation processes other than simple fractional distillation. In Figure 3 of the drawing, there is illustrated an extractive distillation column which utilizes the control system of this invention. Column 86 is similar to the one used for ordinary fractionation, containing a plurality of spaced bubble plates or the like at which the vapors and liquid make contact with one another. The feed mixture to be separated is supplied to an intermediate point in column 86 through an inlet line 87 at a rate dependent upon the setting given differential pressure controller 88. The differential pressure controller acts as an override for rate-of-flow controller 89, which is provided with a pneumatic set mechanism and which adjusts valve 91 in line 87. Controller 88, which is given a setting corresponding to the pressure drop desired to be maintained through the column, supplies a pneumatic signal proportional to the measured pressure drop to the pneumatic set mechanism associated with rate-of-flow controller 89. The pneumatic set mechanism in turn resets the control index setting of the rate of flow controller with the result that controller 89 adjusts valve 91 so that feed is supplied at a rate sufficient to maintain a pressure drop through the column corresponding to the setting of controller 88. It is also within the scope of the invention to have controller 88 adjust valve 91 directly in which case the rate-of-flow controller and its associated pneumatic set mechanism can be omitted. Since the utilization of the control system of the instant invention is especially adapted to processing a maximum quantity of feed, it is preferred to give differential pressure controller 88 a setting such that a maximum pressure drop will be maintained through the column short of flooding the column. The feed mixture is separated within the column 86 into a liquid bottoms product which is withdrawn through line 92. The selective solvent enters the upper region of column 86 through line 93.

The rate of withdrawal of bottoms product through line 92 is controlled by a liquid level controller 94 on the bottom of column 86. The liquid level controller regulates valve 96 in line 92. Heat is supplied to the lower portion of column 86 through a steam line 97 which communicates with coils 98 disposed in the lower portion of the column. The steam condensate is removed from the coils through line 99.

The vapors and/or gases comprising the relatively light components of the feed mixture supplied to column 86 are passed from the upper portion of the column through line 101 to a condenser 102 wherein they are condensed. The resulting condensate is then passed through line 103 to a reflux accumulator 104. In order to maintain a desired operating pressure in column 86, an automatic pressure control valve 106 responsive to pressure controller 107 is provided in line 101.

The distillate collected in accumulator 104 is discharged through line 108. A portion of the distillate is then directed through line 109 back into the upper portion of column 86 as reflux at a rate controlled by rate-of-flow controller 110 which regulates a valve 111 in line 109. The remainder of the distillate is directed through an overhead product line 112 at a rate controlled by liquid level controller 113 attached to reflux accumulator 104 and valve 114 in line 112.

For a better understanding of the control system of this invention as applied to an extractive distillation process, reference will be made to a particular separation such as the separation of normal butane from butenes-2. An essentially binary mixture such as this is not readily separated by simple distillation. In the presence of a suitable selective solvent, such as furfural, in the liquid phase, however, the volatility of normal butane with relation to butenes-2 is increased, and as a result normal butane is separated as overhead product. It is to be understood that the invention is not limited to this particular separation, for it is in general applicable to any extractive distillation for the separation of paraffins, olefins, and diolefins and for the separation of aromatics from non-aromatic hydrocarbons.

An essentially binary mixture of normal butane and butenes-2 is charged to column 86 through line 87. A sample stream is removed from the upper portion of column 86 and passed to infrared analyzer 116 which has been sensitized for butenes-2. The sample can be taken from the vapor phase of a selected plate of column 86 in which case it is removed from the column through line 117, valve 118 in line 119 being closed. Alternatively, a sample can be taken from the overhead product stream through line 119, valve 121 in line 117 being closed. It is to be understood that when the sample is taken from an upper portion of the column, the amount of butenes-2 in the sample will be greater than when the sample is taken directly from the overhead stream. However, a determination of the amount of butenes-2 which should be present in the sample removed from the plate in order to give a product having a desired composition can be easily made.

Since the sample streams may be contaminated with furfural, it is important that the furfural be removed for successful operation of the analyzer. Such removal can be accomplished by dissolving the furfural in water. Accordingly, lines 117 and 119 are connected to furfural separators 122 and 123, respectively, which comprises a vessel filled with ceramic pebbles and having water inlet lines 124 and 125 attached thereto. Furfural and water are removed from separator 122 through line 130 and from separator 123 through line 126 depending upon where the sample is taken from the column. The sample streams free from furfural are removed from the separators through vapor lines 127 and 128 which are further connected to the sample cell of analyzer 116. A condenser, not shown, is provided in each of separators 122 and 123 to remove a portion of the water vapor which may be present in the vapor lines. A pressure regulator, also not shown and generally built into the analyzer itself, is provided to reduce the pressure of the vaporous sample streams leaving the separators prior to introduction into the sample cell of the analyzer. Line 129 provides means for removing the sample streams from the analyzer.

The output signal from analyzer 116 is applied to recorder-controller 131 which is supplied with a source of input air through line 132. Controller 131 provides a regulated output air pressure in line 133 which is proportional to the signal from analyzer 116. It is noted also that the pressure in line 133 is proportional to the amount of butenes-2 contained in the sample stream. The output air pressure in line 133 is applied to the pneumatic set mechanism associated with rate-of-flow controller 134 which adjusts the set point of the controller. In this manner, the rate at which furfural is supplied to the column is controlled in accordance with the amount of butenes-2 contained in the sample stream.

Another sample stream is removed from the lower portion of column 86 and passed to infrared analyzer 137 which has been sensitized for normal butane. The sample is preferably taken from the vapor phase of one of the lower plates in the column and removed from the column through line 138. As discussed with relation to the other sample streams, it is necessary to remove any traces of furfural which may be contained in the stream. Accordingly, the stream removed from the column through line 138 is passed into furfural separator 139 provided with a water inlet line 140. Separator 139 is similar to separators 122 and 123 as described hereinabove. Furfural and water are removed from the separator through line 141 while the sample stream free from furfural is taken overhead through line 142. Line 142 is further connected to the sample cell of analyzer 137. As discussed with regard to the first sample, the amount of normal butane which should be present in the sample in order to provide a bottoms product of desired purity can be easily determined. The sample is vented from analyzer 137 through line 143.

The output signal from analyzer 137 is applied to recorder-controller 144 which is supplied with a source of input air through line 146. Controller 144 provides a regulated output air-pressure in line 147 which is proportional to the signal from analyzer 137. The output air pressure in line 147 is also proportional to the amount of normal butane contained in the sample stream. Rateof-flow controller 148, which is provided with a pneumatic set mechanism, adjusts valve 149 in steam line 97. The output pressure in line 147 is applied to the pneumatic set mechanism which in turn adjusts the set point of controller 148. The rate at which reboiler heat is supplied to the column is thus controlled in accordance with the amount of normal butane contained in the sample stream.

The infrared anlyzers act as overrides for rate-of-flow controllers 134 and 148. It is within the scope of the invention, however, to omit the rate-of-flow controllers and allow controllers 131 and 144 to control valves 136 and 149 directly. The infrared analyzers illustrated in Figure 3 are similar to the one shown in Figure 2 and operate in the same manner as described hereinabove with relation to this latter figure.

After column 86 has been lined out and is on automatic control, the column operates automatically so as to obtain two products of specification purity. It is assumed, by way of example, that the feed stream contains about 75 mol percent normal butane and 25 mol percent butenes-2 and that it is desired to recover a normal butane overhead product stream containing no more than 1.5 mol percent butenes-2 and a bottoms product stream containing no more than 3 percent normal butane. The set points of recorder-controllers 131 and 144 associated with analyzers 116 and 137 are set so as to correspond to these desired product compositions. For purpose of description, it is assumed that an increase in air pressure tends to close valves 136 and 149. Now if the analysis of the sample stream passed through analyzer 116 indicates that the overhead product stream contains more than 1.5 mol percent butenes-2, the pressure of the output air signal from controller 131 decreases and valve 136 is opened further in order to increase the rate of furfural introduction. Conversely, if the analysis shows that the product stream contains less than 1.5 butenes-2, then the pressure of the output air signal from controller 131 increases and valve 136 is closed somewhat in order to decrease the rate of furfural introduction. In the case of the amount of reboiler heat supplied to the column, the pressure of the output signal from controller 144 increases or decreases depending upon the analysis of the sample stream removed through line 138. If the analysis of the sample stream indicates a kettle product containing more than 3 mol percent normal butane, then controller 144 supplies decreasing air pressure so that valve 149 is opened further, thereby increasing the rate of supply of reboiler heat to the column. On the other hand, when the analysis of the sample stream shows a kettle product containing less than 3 mol percent normal butane, controller 144 supplies an increasing air output so that valve 149 is closed somewhat so as to decrease the rate of supply of reboiler heat.

The overall effect of changing any one of the process variables in extractive distillation, as indicated above, is very similar to that described with relation to fractional distillation. The process variables which are effected are of course different, but in either case a change in one variable has a direct effect upon the other variables. And the instrumentation of this invention operates to continuously balance the variables so that two product streams of specification quality can be recovered. It is noted also with regard to extractive distillation that the reflux rate remains substantially constant. Further, the amount of liquid returned to the column as reflux is comparatively small, being merely enough to prevent furfural from being taken overhead.

While the present invention has been described specifically with relation to simple fractional distillation and extractive distillation processes, it is not intended to limit the invention to these two processes. In general, the invention is applicable to the operation of any fractionation column in which an essentially binary mixture is separated so as to obtain two products of specification quality. Thus, the present invention can be used to control the operation of azeotropic distillation columns, and absorption columns.

The azeotropic distillation process is very similar to the above described extractive distillation process and may be used for various separations such as the separation of aromatics from paraffins. For example, toluene can be separated from a paraffinic hydrocarbon using nitromethane or methanol as the azeotropic solvent. Extractive and azeotropic distillation processes are similar in that both require the addition of a solvent to form non-ideal solutions with one or both of the components of the mixture to be separated and thereby exaggerate the difference in volatility between them. The azeotropic distillation process can be controlled in essentially the same manner as the extractive distillation process by using analytical instruments such as two infrared analyzers as described hereinabove, to analyze two sample streams removed from the azeotropic column and adjust two of the process variables so that the two sample streams have a predetermined composition.

Absorption processes are generally employed when one or the other of the components to be separated cannot be condensed conveniently. The principal difference in the various absorption processes resides in the means used to separate product and absorber oil. For example, in one type of absorption, the change in product solubility with temperature is so low that the product is separated by reducing the pressure of the rich oil rather than by heating it. This type of absorption is used to separate hydrogen from methane in refinery gases. In this process, the gaseous mixture of hydrogen and methane is introduced into a lower portion of the column while the lean absorber oil is charged to the top of the column. Rich absorber oil comprising a solution of methane in oil is removed from the bottom of the column and reduced in pressure in order to disengage the bottoms gaseous product. A gaseous stream comprising hydrogen is removed from the top of the column. A portion of the methane may be recompressed and returned to the bottom of the column.

A more comprehensive understanding of the invention may be obtained by referring to the following illustrative examples which are not intended, however, to be unduly limitative of the invention.

*Example I*

Fractional distillation apparatus similar to that illustrated in Figure 1 is utilized to perform the following separation:

[Stream compositions—mol percent.]

| Component | Feed | Overhead Product | Kettle Product |
|---|---|---|---|
| $C_3H_8$ | 0.1 | 0.5 | |
| $i\text{-}C_4H_{10}$ | 20.5 | 96.0 | 1.9 |
| $n\text{-}C_4H_{10}$ | 79.3 | 3.5 | 98.0 |
| $i\text{-}C_5H_{12}$ | 0.1 | | 0.1 |

The analyzer sampling overhead product is sensitized for n-butane while the other analyzer sampling a stream removed from the 20th tray from the bottom of an 80 tray column is sensitized for isobutane. The infrared analyzers used are the type disclosed in U.S. Patent No. 2,579,825. The potentiometer recorder controllers which are used with the infrared analyzers are each fitted with a pneumatic control unit and are commercially available instruments of the type manufactured by the Brown Instrument Company, Philadelphia, Pennsylvania. The rate-of-flow controllers and pneumatic set mechanisms are obtainable as a single unit from the Foxboro Company, Foxboro, Massachusetts. In order to obtain a bottoms product having the desired purity, it has been determined that the sample stream removed from the 20th tray should contain 14 mol percent isobutane. The set points of the recorder-controllers of the two analyzers are set to correspond to the aforementioned stream compositions. Feed is supplied to the column at a rate of 548,000 gallons per day, and a portion of the overhead is returned to the column as reflux at the rate of 2,060,000 gallons per day. Overhead product n-butane is recovered at the rate of 102,000 gallons per day while the kettle product isobutane is withdrawn at the rate of 446,000 gallons per day. The pressure in the top of the column is 137 p.s.i.g. and in the bottom 144 p.s.i.g. The overhead vapor temperature is 150° F. while the kettle temperature is 179° F. The analyzer sensitized to n-butane automatically controls the rate of feed introduction so that an overhead product containing 96.0 mol percent isobutane is recovered. Thus, if the sample stream contains more than 3.5 mol percent n-butane, the analyzer operates to reduce the rate of feed introduction. Alternatively, if the sample stream contains less than 3.5 mol percent n-butane, the rate of feed introduction is caused to be increased. The analyzer sensitized to isobutane automatically controls the rate of bottoms withdrawal so that a kettle product containing 98.0 percent n-butane is recovered. If the sample stream contains more than 14 mol percent isobutane, this latter analyzer operates to reduce the rate of product withdrawal. On the other hand, if the sample stream contains less than 14 mol percent isobutane, the rate of kettle product withdrawal is increased through the operation of the analyzer.

*Example II*

Extractive distillation apparatus similar to that illustrated in Figure 3 is utilized to perform the following separation:

[Stream compositions—mol percent.]

| Component | Feed | Overhead Product | Kettle Product |
|---|---|---|---|
| n-butane | 79.0 | 98.0 | 4.0 |
| Butenes-2 | 20.8 | 1.8 | 96.0 |
| Other C₄'s | 0.2 | 0.2 | |

The column which is a 100 plate column is operated at a pressure of 67 p.s.i.g. with a bottom temperature of 300° F. and an overhead vapor temperature of 90° F. The feed material is supplied to the 39th tray, numbered from the bottom, at a rate of 21,000 gallons per hour. Liquid furfural is introduced at the 94th tray, numbered from the bottom, at the rate of 180,000 gallons per hour, and flows downwardly over the trays to the reboiler. The overhead product is removed at a rate of 16,500 gallons per hour while 10,000 gallons per hour are returned to the column as reflux. Rich furfural is withdrawn from the bottom of the column at a rate of 184,500 gallons per hour. Steam is supplied to the reboiler at a rate of 200,000 pounds per hour. The analyzer sampling overhead product is sensitized for butenes-2 while the other analyzer sampling a stream removed from the 25th tray from the bottom of the 120 tray column is sensitized for n-butane. In order to obtain a bottoms product having the desired purity, it has been determined that the sample stream from the 25th tray should contain 21 mol percent n-butane. The set points of the two analyzers are set to correspond to the aforementioned stream compositions. The instruments used in this example are similar to those described with relation to Example I. The overhead sample stream is passed into a furfural separator prior to introduction into the sample cell of the analyzer to remove any traces of furfural. The sample stream removed from the 25th tray is passed into a furfural separator where the hydrocarbons are separated from traces of furfural prior to introduction into the sample cell. The analyzer sensitized to butenes-2 automatically controls the rate of furfural introduction so that an overhead product containing 98 mol percent n-butane is recovered. Thus, if the sample stream contains more than 1.8 mol percent butenes-2, the analyzer operates to increase the rate of furfural introduction. Alternatively, if the sample stream contains less than 1.8 mol percent butenes-2, the rate of furfural introduction is decreased. The analyzer sensitized for n-butane automatically controls the rate of supply of reboiler heat to the column. If the sample stream taken from the bottom portion of the column contains more than 21 mol percent n-butane, the analyzer operates to increase the rate of supply of reboiler heat to the column. On the other hand, if the sample stream contains less than 21 mol percent n-butane, the rate of supply of reboiler heat is decreased through the operation of the analyzer.

It will be apparent to those skilled in the art that various modifications of the invention can be made upon study of the foregoing disclosure. Such modifications are believed to be clearly within the spirit and scope of this invention.

I claim:

1. A system for separating an essentially binary feed mixture into two product streams comprising, in combination, a fractionation column; means for introducing said feed mixture into an intermediate portion of said column; means for introducing a liquid material into an upper portion of said column; means for withdrawing an overhead product from the top of said column; means for withdrawing a kettle product from the bottom of said column; means for introducing heat into the bottom of said column; means for continuously removing a first sample stream from an upper portion of said column; first means for analyzing said first sample stream to determine the concentration therein of one of the components of said feed mixture; means responsive to said first analyzing means for adjusting one of said withdrawal and introduction means so as to maintain the concentration of one of the components of said feed mixture in said first sample stream at a constant preselected value; means for continuously removing a second sample stream from a lower portion of said column; second means for analyzing said second sample stream to determine the concentration therein of the other component of said feed mixture; and means responsive to said second analyzing means for adjusting another of said withdrawal and introduction means so as to maintain the concentration of said other component of said feed mixture in said second sample stream at a constant preselected value.

2. A system for separating an essentially binary feed mixture into two product streams comprising, in combination, a fractionation column; means for introducing said feed mixture into an intermediate portion of said column; means for introducing a liquid material into an upper portion of said column; means for withdrawing an overhead product from the top of said column; means for withdrawing a kettle product from the bottom of said column; means for introducing heat into the bottom of said column; means for continuously removing a first sample stream from an upper portion of said column; first means for analyzing said first sample stream to determine the concentration therein of one of the components of said feed mixture; means responsive to said first analyzing means for adjusting said feed introduction means so as to maintain the concentration of one of the components of said feed mixture in said first sample stream at a constant preselected value; means for continuously removing a second sample stream from a lower portion of said column; second means for analyzing said second sample stream to determine the concentration therein of the other component of said feed mixture; and means responsive to said second analyzing means for adjusting said kettle product withdrawal means so as to maintain the concentration of said other component of said feed mixture in said second sample stream at a constant preselected value.

3. A system for separating an essentially binary feed mixture into two product streams comprising, in combination, a fractionation column; means for introducing said feed mixture into an intermediate portion of said column; means for introducing a selective solvent into an upper portion of said column; means for withdrawing an overhead product from the top of said column; means for withdrawing a kettle product from the bottom of said column; means for introducing heat into the bottom of said column; means for measuring the pressure drop through said column; means responsive to said latter means for adjusting said means for introducing said feed mixture into an intermediate portion of said column; means for continuously removing a first sample stream from an upper portion of said column; first means for analyzing said first sample stream to determine the concentration therein of one of the components of said feed mixture; means responsive to said first analyzing means for adjusting said selective solvent introduction means so as to maintain the concentration of one of the components of said feed mixture in said first sample stream at a constant preselected value; means for continuously removing a second sample stream from a lower portion of said column; second means for analyzing said second sample stream to determine the concentration therein of the other component of said feed mixture; and means responsive to said second analyzing means for adjusting said heat introduction means so as to maintain the concentration of said other component of said feed mixture in said second sample stream at a constant preselected value.

4. In fractionation apparatus for separating an essentially binary feed mixture comprising a fractionation column, means for introducing said feed mixture into said column, means for introducing a liquid material into an upper portion of said column, means for withdrawing an overhead product from said column, means for withdrawing a kettle product from said column, and means for introducing heat into the bottom of said column, the improvement of means for controlling the operation of said column, said control means comprising means for measuring the pressure drop through said column; means responsive to said latter means for adjusting said means for introducing a liquid material into an upper portion of said column; means for withdrawing a first sample stream from an upper portion of said column; means for withdrawing a second sample stream from a lower portion of said column; a first source of infrared radiation; a first pair of radiation detecting elements; first means for directing first and second beams of radiation from said first source to respective ones of said first pair of detecting elements; a first sample cell disposed in both of said first and second beams of radiation; means for passing said first sample stream through said first sample cell; a first filter disposed in one of said first and second beams of radiation; first means responsive to differences in intensity of radiation impinging upon said first pair of detecting elements for adjusting one of said withdrawal and introduction means of said column; a second source of infrared radiation; a second pair of radiation detecting elements; second means for directing third and fourth beams of radiation from said second source to respective ones of said second pair of detecting elements; a second sample cell disposed in both of said first and second beams of radiation; means for passing said second sample stream through said second sample cell; a second filter disposed in one of said third and fourth beams of radiation; and second means responsive to differences in intensity of radiation impinging upon said second pair of detecting elements for adjusting another of said withdrawal and introduction means of said column.

5. In a process for separating an essentially binary feed mixture into two product streams of specification quality in which the process variables include the rate of introduction of feed material into a separation zone, the rate of overhead product withdrawal from said zone, the rate of introduction of liquid material into an upper portion of said zone, the rate of kettle product withdrawal from said zone, the rate of heat introduction into said zone, the improvement comprising continuously withdrawing a first sample stream from an upper portion of said zone; analyzing said first sample stream to determine the concentration of one of the components of said mixture; adjusting one of said process variables so as to maintain the composition of said first sample stream constant with respect to the component being measured; continuously withdrawing a second sample stream from a lower portion of said zone; analyzing said second sample stream to determine the concentration of the other component of said feed mixture; and adjusting another of said process variables so as to maintain the composition of said second sample stream constant with respect to the component being measured.

6. A process for separating an essentially binary feed mixture into two product streams of specification quality which comprises passing said feed mixture into a separation zone; withdrawing an overhead product from an upper portion of said separation zone; introducing a portion of said withdrawn overhead product into an upper portion of said separation zone withdrawing a kettle product from a lower portion of said separation zone; introducing heat into said lower portion of said zone; continuously withdrawing a first sample stream from an upper portion of said zone; analyzing said first sample stream to determine the concentration of one of the components of said feed mixture; adjusting the rate of flow of said feed mixture into said zone so as to maintain the composition of said first sample stream constant with respect to the component being measured; continuously withdrawing a second sample stream from a lower portion of said zone; analyzing said second sample stream to determine the concentration of the other component of said feed mixture; and adjusting the rate of flow of kettle product from said zone so as to maintain the composition of said second sample stream constant with respect to the component being measured.

7. A process for separating an essentially binary feed into two product streams of specification quality which comprises passing said feed mixture into a separation zone; withdrawing an overhead product from an upper portion of said zone; withdrawing a kettle product from a lower portion of said zone; introducing a selective solvent into an upper portion of said zone; introducing heat into said lower end of said zone; continuously withdrawing a first sample stream from an upper portion of said zone; analyzing said first sample stream to determine the concentration of one of the components of said feed mixture; adjusting the rate of flow of selective solvent into said zone so as to maintain the composition of said first sample constant with respect to the component being measured; continuously withdrawing a second sample from a lower portion of said zone; analyzing said second sample stream to determine the concentration of the other of the components of said feed mixture; and adjusting the rate of heat introduction into said zone so as to maintain the composition of said second sample stream constant with respect to the component being measured.

8. A process for separating a feed mixture consisting essentially of isobutane and n-butane which comprises passing said feed mixture into a separation zone; withdrawing an overhead product stream containing a predetermined mol percent of isobutane from an upper portion of said zone; introducing a portion of said withdrawn overhead product stream into an upper portion of said zone withdrawing a kettle product stream containing a predetermined mol percent of n-butane from a lower portion of said zone; returning a preselected portion of said overhead product stream to said zone as reflux; adding a predetermined quantity of heat to the lower portion of said zone; continuously withdrawing a first sample stream from an upper portion of said zone; passing a beam of infrared radiation through said first sample stream; measuring the radiation absorbed by said first sample stream which is characteristic of the radiation absorbed by n-butane; adjusting the rate of flow of said feed mixture into said zone in response to said measurement so as to maintain the concentration of said n-butane in said first sample stream at a constant preselected value; continuously withdrawing a second sample stream from a lower portion of said zone; passing a beam of infrared radiation through said second sample stream; measuring the radiation absorbed by said second sample stream which is characteristic of the radiation absorbed by isobutane; and adjusting the rate of flow of said kettle product stream from said zone in response to said measurement so as to maintain the concentration of said isobutane in said second sample stream at a constant preselected value.

9. A process for separating a feed mixture consisting essentially of n-butane and 2-butenes which comprises passing said feed mixture into a separation zone; withdrawing an overhead product stream containing a predetermined mol percent of n-butane from an upper portion of said zone; withdrawing a kettle product stream containing a predetermined mol percent of 2-butenes from a lower portion of said zone; returning a preselected portion of said overhead product stream to said zone as reflux; adding a predetermined quantity of heat to the lower portion of said zone; introducing a stream of furfural into said zone; continuously withdrawing a first sample stream from an upper portion of said zone; separating furfural from said first sample stream; passing a beam of infrared radiation through the resulting furfural-free first sample stream; measuring the radiation absorbed by said first sample stream which is characteristic of the radiation absorbed by 2-butenes; adjusting the rate of flow of said furfural stream in response to said measurement so as to maintain the concentration of the 2-butenes in said first sample stream at a constant preselected value; continuously withdrawing a second sample stream from a lower portion of said zone; separating furfural from said second sample stream; passing a beam of infrared radiation through the resulting furfural-free second sample stream; measuring the radiation absorbed by said second sample stream which is characteristic of the radiation absorbed by n-butane; and adjusting the quantity of head added to said zone in response to said measurement so as to maintain the concentration of the n-butane in said second sample stream at a constant preselected value.

10. A system for separating an essentially binary feed mixture into two product streams comprising, in combination, a fractionation column; means for introducing said feed mixture into an intermediate portion of said column; means for introducing a liquid material into an upper portion of said column; means for withdrawing an overhead product from the top of said column; means for withdrawing a kettle product from the bottom of said column; means for introducing heat into the bottom of said column; means for continuously removing a first sample stream from an upper portion of said column; first means for analyzing said first sample stream to determine the concentration therein of one of the components of said feed mixture; means responsive to said first analyzing means for adjusting said feed introduction means so as to maintain the concentration of one of the components of said feed mixture in said first sample stream at a constant preselected value; means for continuously removing a second sample stream from a lower portion of said column; second means for analyzing said second sample stream to determine the concentration therein of the other component of said feed mixture; means responsive to said second analyzing means for adjusting said kettle product withdrawal means so as to maintain the concentration of said other component of said feed mixture in said second sample stream at a constant preselected value; means for measuring the pressure drop through said column; and means responsive to said latter means for adjusting said means for introducing a liquid material into an upper portion of said column.

11. In fractionation apparatus for separating an essentially binary feed mixture comprising a fractionation column, means for introducing said feed mixture into said column, means for introducing a liquid material into an upper portion of said column, means for withdrawing an overhead product from said column, means for withdrawing a kettle product from said column, and means for introducing heat into the bottom of said column, the improvement of means for controlling the operation of said column, said control means comprising means for measuring the pressure drop through said column; means responsive to said latter means for adjusting said means for introducing a liquid material into an upper portion of said column; means for withdrawing a first sample stream from an upper portion of said column; means for withdrawing a second sample stream from a lower portion of said column; a first source of infrared radiation; a first pair of radiation detecting elements; first means for directing first and second beams of radiation from said first source to respective ones of said first pair of detecting elements; a first sample cell disposed in both of said first and second beams of radiation; means for passing said first sample stream through said first sample cell; a first filter disposed in one of said first and second beams of radiation; first means responsive to differences in intensity of radiation impinging upon said first pair of detecting elements for adjusting said feed introduction means; a second source of infrared radiation; a second pair of radiation detecting elements; a second means for directing third and fourth beams of radiation from said second source to respective ones of said second pair of detecting elements; a second sample cell disposed in both of said first and second beams of radiation; means for passing said second sample stream through said second sample cell; a second filter disposed in one of said third and fourth beams of radiation; and second means responsive to differences in intensity of radiation impringing upon said second pair of detecting elements for adjusting said kettle product withdrawal means.

References Cited in the file of this patent

UNITED STATES PATENTS

| | | |
|---|---|---|
| 2,336,097 | Hutchinson | Dec. 7, 1943 |
| 2,553,469 | Pellettere | May 15, 1951 |
| 2,579,825 | Hutchins | Dec. 25, 1951 |
| 2,617,940 | Giguere | Nov. 11, 1952 |
| 2,690,694 | Wilson | Oct. 5, 1954 |
| 2,692,820 | Alway et al. | Oct. 26, 1954 |
| 2,750,511 | Miller | June 12, 1956 |
| 2,762,208 | Dennis | Sept. 11, 1956 |
| 2,764,536 | Hutchins | Sept. 25, 1956 |

OTHER REFERENCES

Elements of Fractional Distillation (Fourth Edition), by Robinson and Gilliland, pp. 472 to 476 relied on.